(12) United States Patent
Sahara et al.

(10) Patent No.: US 8,537,946 B2
(45) Date of Patent: *Sep. 17, 2013

(54) WIRELESS COMMUNICATION METHOD, WIRELESS COMMUNICATION SYSTEM AND BASE STATION

(75) Inventors: Toru Sahara, Yokohama (JP); Youhei Murakami, Yokohama (JP)

(73) Assignee: Kyocera Corporation, Kyoto (JP)

( * ) Notice: Subject to any disclaimer, the term of this patent is extended or adjusted under 35 U.S.C. 154(b) by 289 days.

This patent is subject to a terminal disclaimer.

(21) Appl. No.: 12/865,121

(22) PCT Filed: Jan. 27, 2009

(86) PCT No.: PCT/JP2009/051282
§ 371 (c)(1),
(2), (4) Date: Nov. 30, 2010

(87) PCT Pub. No.: WO2009/096393
PCT Pub. Date: Aug. 6, 2009

(65) Prior Publication Data
US 2011/0075749 A1   Mar. 31, 2011

(30) Foreign Application Priority Data

Jan. 28, 2008 (JP) .................. 2008-016974
Mar. 26, 2008 (JP) .................. 2008-081382

(51) Int. Cl.
*H04L 7/00* (2006.01)
(52) U.S. Cl.
USPC .......................... 375/355; 455/502
(58) Field of Classification Search
USPC ......... 375/355–356, 358, 259–260; 370/206, 370/431, 438, 503; 455/502
See application file for complete search history.

(56) References Cited

U.S. PATENT DOCUMENTS

| 6,967,936 B1 | 11/2005 | Laroia et al. |
| 7,212,821 B2 * | 5/2007 | Laroia et al. .............. 455/437 |

(Continued)

FOREIGN PATENT DOCUMENTS

| CN | 1505292 | 6/2004 |
| JP | 09-266466 | 10/1997 |

(Continued)

OTHER PUBLICATIONS

International Search Report for PCT/JP2009/051282, mailed on Apr. 28, 2009, 2 pages.

(Continued)

*Primary Examiner* — Jean B Corrielus
(74) *Attorney, Agent, or Firm* — Duane Morris LLP

(57) ABSTRACT

One of the objects of the present invention is to more completely avoid impossibility of access between a mobile station and a base station, in wireless communication using an OFDM (Orthogonal Frequency Division Multiplexing) modulation scheme. In one embodiment, a base station removes a guard interval from an OFDM symbol received from a PHS terminal through a timing correction channel at two different timings to obtain two effective symbols, calculates a timing correction amount by including one timing, at which an guard interval is removed for the effective symbol that has caused detection of one correlation peak within a predetermined timing detection range of two correlation peaks detected from the respective effective symbols, into a differential from reference timing of the base station at the time of detection of the one correlation peak, and transmits the timing correction amount to the PHS terminal by means of a timing correction burst.

10 Claims, 14 Drawing Sheets

(56) References Cited

U.S. PATENT DOCUMENTS

| | | | |
|---|---|---|---|
| 7,983,702 B2 * | 7/2011 | Li et al. | 455/502 |
| 2004/0052319 A1 | 3/2004 | Wakamatsu | |
| 2006/0031583 A1 * | 2/2006 | Fujii et al. | 709/246 |
| 2006/0274777 A1 | 12/2006 | Fujii et al. | |
| 2007/0036231 A1 * | 2/2007 | Ido | 375/260 |
| 2008/0013478 A1 * | 1/2008 | Rangan et al. | 370/328 |
| 2008/0063101 A1 * | 3/2008 | Cimini et al. | 375/260 |
| 2009/0046604 A1 | 2/2009 | Matsumoto et al. | |
| 2010/0097962 A1 | 4/2010 | Sahara et al. | |

FOREIGN PATENT DOCUMENTS

| | | |
|---|---|---|
| JP | 11-113049 | 4/1999 |
| JP | 2000-068972 | 3/2000 |
| JP | 2000-134176 | 5/2000 |
| JP | 2000-252947 | 9/2000 |
| JP | 2000-315991 | 11/2000 |
| JP | 2001-119368 | 4/2001 |
| JP | 2001-257641 | 9/2001 |
| JP | 2003-069546 | 3/2003 |
| JP | 2006-310986 | 11/2006 |
| JP | 2009-010661 | 1/2009 |
| JP | 2009-010662 | 1/2009 |
| WO | WO-2006/075586 | 7/2006 |
| WO | WO-2008/038543 | 4/2008 |
| WO | WO-2009/041547 | 4/2009 |

OTHER PUBLICATIONS

CN200980103319 Office Action mailed Jan. 14, 2013.

* cited by examiner

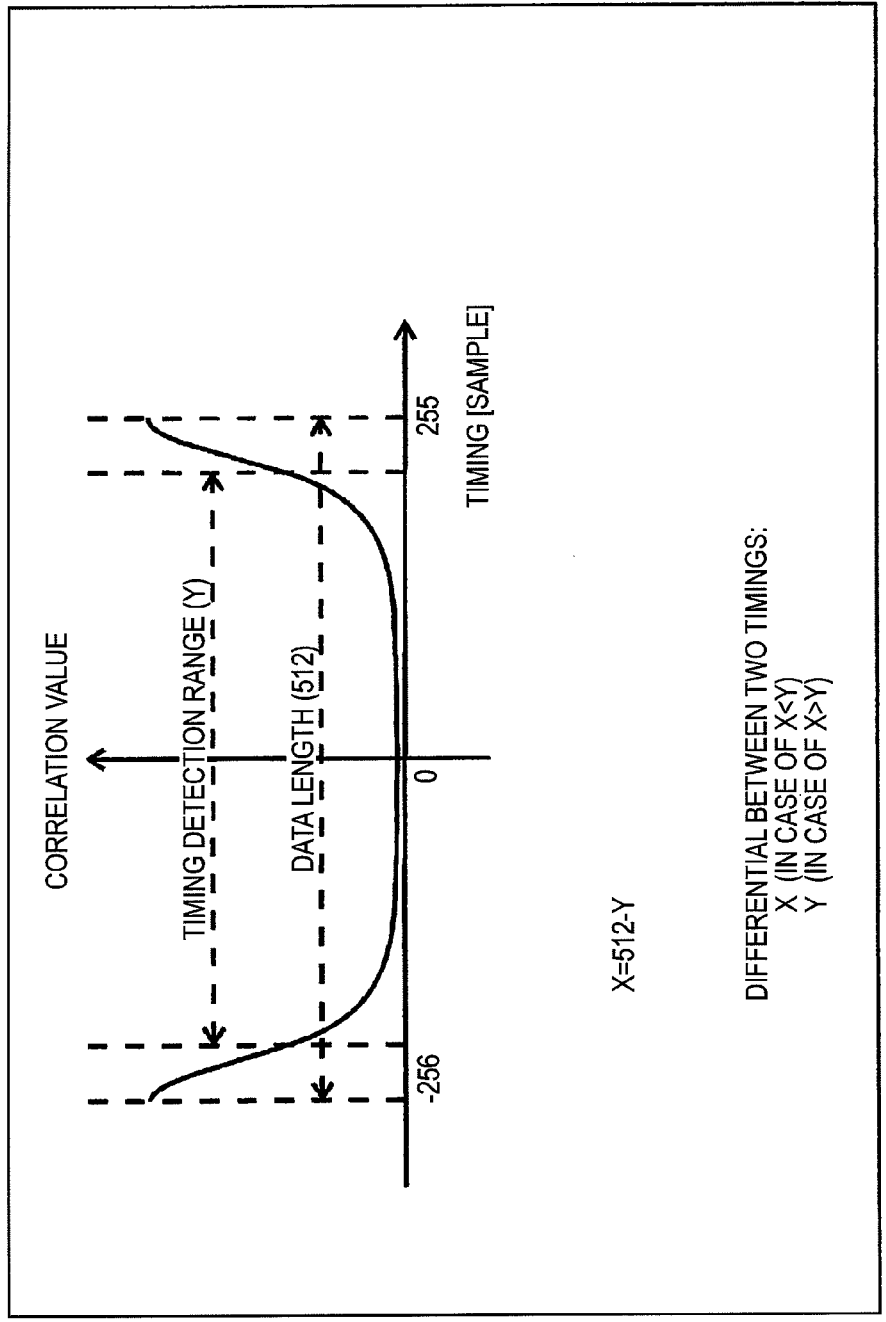

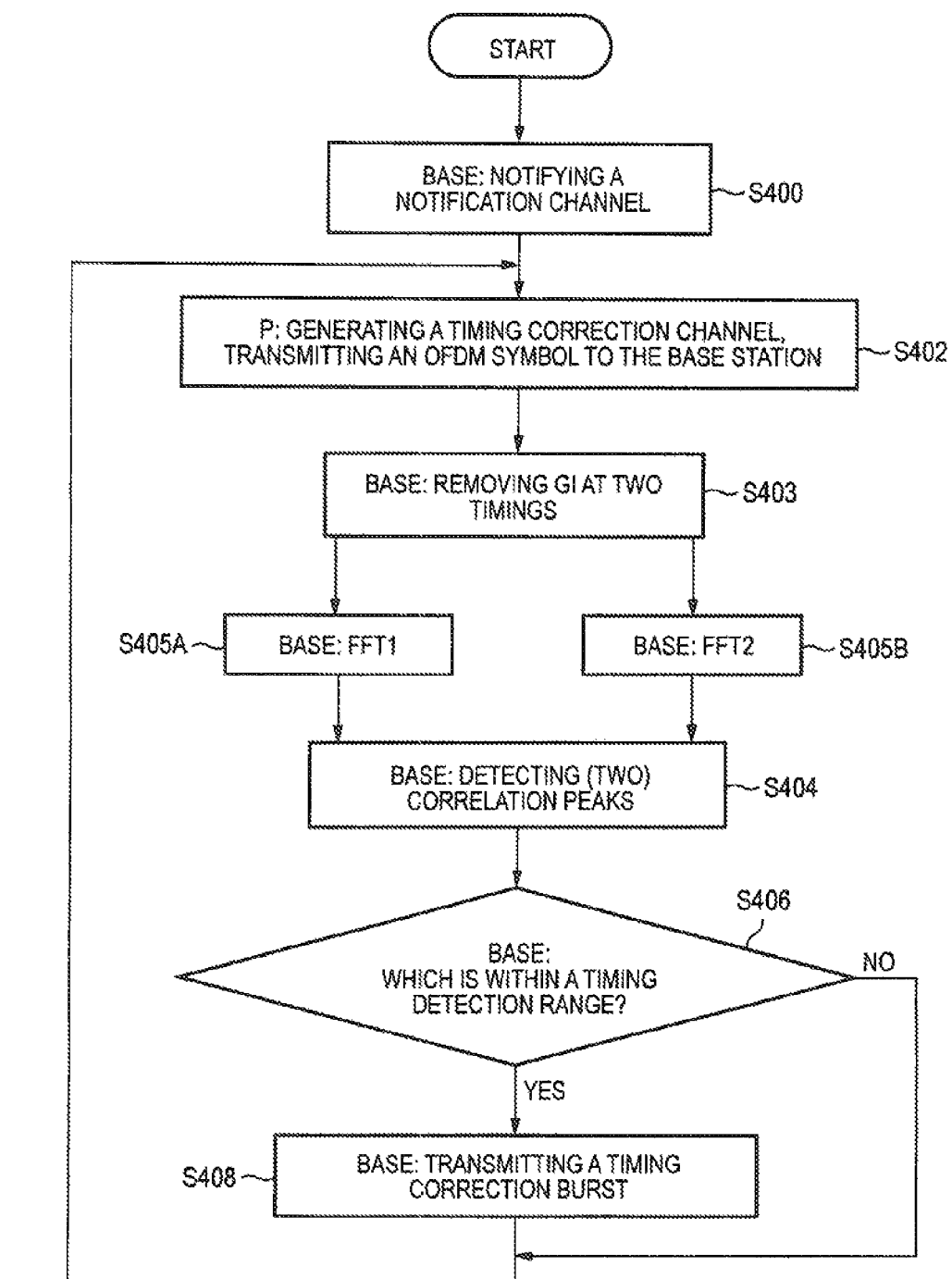

(FIG. 8A continued)

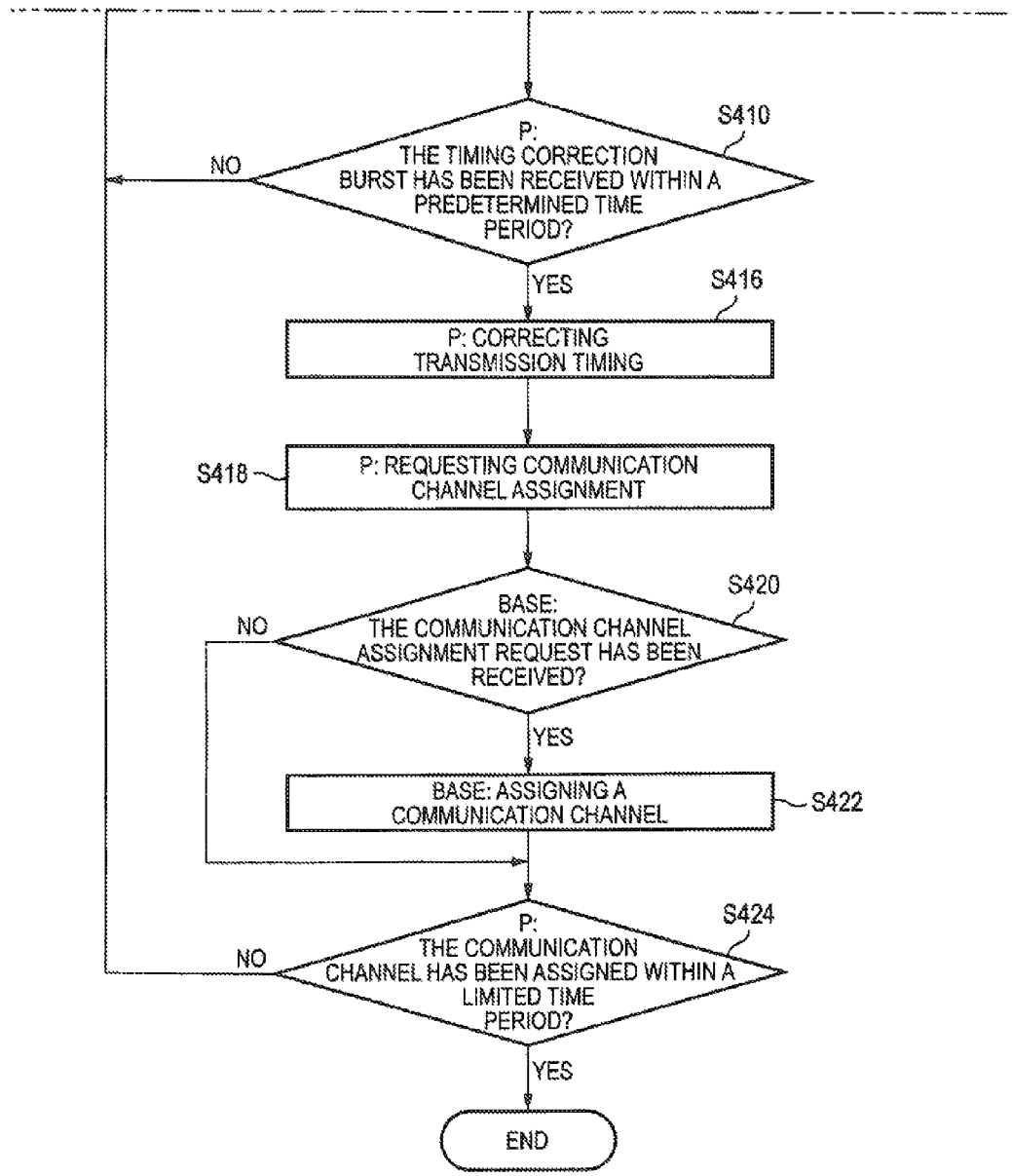

WIRELESS COMMUNICATION METHOD, WIRELESS COMMUNICATION SYSTEM AND BASE STATION

CROSS-REFERENCE TO RELATED APPLICATIONS

This is a U.S. National Phase Application of International Application No. PCT/JP2009/051282 filed Jan. 27, 2009, which claims priority to Japanese Patent Applications No. 2008-016974 filed Jan. 28, 2008 and No. 2008-081382 filed Mar. 26, 2008, the disclosures of which are incorporated herein by reference in their entirety.

TECHNICAL FIELD

The present invention relates to a wireless communication method, a wireless communication system, and a base station, which conduct wireless communication using an OFDM (Orthogonal Frequency Division Multiplexing) modulation scheme.

BACKGROUND ART

In recent years, as a mobile station represented by a mobile phone system, a PHS (Personal Handy phone System), and a PDA (Personal Digital Assistant) have been provided. These mobile stations are capable of conducting communication such as making and receiving a call and transmitting and receiving data by accessing base stations installed with a predetermined distance from one another through a communication network accessed by the base stations.

One of schemes used for such a wireless communication system to transmit a digital signal is an OFDM modulation scheme. Since an OFDM modulation scheme transmits transmission data by distributing them to a plurality of carriers, in which orthogonal frequencies are set, a band of each of the carriers becomes narrow, so that frequency use efficiency is very high.

In addition, as shown in FIG. 12, the OFDM modulation scheme is composed of an effective symbol corresponding to a signal period, during which IFFT (Inverse Fast Fourier Transformation) is performed at the time of transmission, and a guard interval 50 obtained by copying the waveform of a part of the latter half of the effective symbol as it is. For example, if the effective symbol length is 512 samples, the guard interval 50 is 64 samples, which is ⅛ of the effective symbol length. And, the guard interval 50 is inserted into a former half of an OFDM symbol. In the OFDM modulation scheme, the insertion of the guard interval 50 permits inter-symbol interference due to multipath, and thereby enhancing the resistance against multipath.

On the other hand, in a wireless communication system of PHS, communication is possible by transmitting and receiving a notification channel (BCCH: Broadcast Control Channel) between the base stations (CS: Cell Station) and the mobile stations (PS: Personal Station) arranged within a service area and assigning a communication channel (TCH: Traffic Channel), at the time of an outgoing call, an incoming call, location registration, and others.

In order to establish such a communication channel, it is necessary to correct transmission timing of a mobile station to be synchronized with reference timing of a base station. To generally explain the flow, firstly, the mobile station generates a channel for timing correction and transmits an OFDM symbol to the base station. The base station detects timing by using the received OFDM symbol and notifies the mobile station of a differential from reference timing of the base station. The mobile station corrects transmission timing to solve the differential from the reference timing.

The mobile station sends a communication channel assignment request for making an outgoing call to the base station at the corrected transmission timing. Upon receiving this request, the base station transmits communication channel assignment information to the mobile station (for example, Patent Literatures 1 to 4).

Patent Literature 1: JP-A-2000-68972
Patent Literature 2: JP-A-2000-134176
Patent Literature 3: JP-A-2000-315991
Patent Literature 4: JP-A-2001-119368

DISCLOSURE OF THE INVENTION

Problems that the Invention is to Solve

In the base station, a guard interval is removed from the OFDM symbol to obtain an effective symbol, and then FFT (Fast Fourier Transformation) is preformed. When detecting timing, IFFT also is performed to detect a correlation peak with a known ideal symbol, which has already been synchronized with the reference timing of the base station. And, the differential from the reference timing of the base station at the time of the detection of the correlation peak is transmitted to the mobile station by means of a timing correction burst (FIG. 13).

However, there is a case where if timing is detected after removal of a guard interval, a correlation peak at timings 60 of both sides of the effective symbol length, to which IFFT is applied, increases (FIG. 14). In this case, the correlation peak is incorrectly detected, so that a correction amount of transmission timing in the mobile station becomes wrong.

As a precautionary measure, it is possible to detect timing prior to removal of a guard interval. However, in the state that different communication channels are mixed, a correlation value of timing detection is reduced, so that it also causes incorrect detection.

In consideration of this problem, the object of the present invention is to provide a wireless communication method, a wireless communication system, and a base station, which are capable of more successfully accomplishing timing detection in the base station, in wireless communication using an OFDM modulation scheme, to more completely avoid impossibility of access between the mobile station and the base station.

Means for Solving the Problems

In order to solve the above-described problems, the representative configuration of the present invention relates to a wireless communication method of conducting wireless communication between a mobile station and a base station by using an OFDM modulation scheme, the method comprising: notifying a notification channel (Broadcast Control Channel; BCCH) from the base station to the mobile station; in the mobile station, generating a channel to be frame synchronized with the notification channel and transmitting an OFDM symbol to the base station, in the base station, as peak detection processes thereof, removing a guard interval from the transmitted OFDM symbol at two different timings to obtain two effective symbols; detecting two correlation peaks between the two respective effective symbols and a known symbol; calculating a timing correction amount by including one timing, at which a guard interval is removed for the effective symbol that has caused detection of one correlation peak that is detected within a predetermined timing detection range shorter than an effective symbol length of the two correlation peaks, of the two different timings into a differential from reference timing of the base station at the time of the detection of the one correlation peak; and transmitting the timing correction amount to the mobile station by means of a timing correction burst; in the mobile station, correcting transmission timing in accordance with the timing correction amount; and transmitting a communication channel assignment request to the base station at the corrected transmission timing.

There has been a case where if timing is detected after a guard interval is removed, a correlation peak at both sides of an effective symbol length to which IFFT is applied increases. In this case, since an incorrect correlation peak is detected, timing detection has been failed. Thus, the base station removes a guide interval at two different timings to detect two correlation peaks and sends a timing correction burst to a mobile station based on one of the correlation peaks, which is presented within a predetermined timing detection range, namely, in the middle of an effective symbol length.

As a result, transmission timing of the mobile station is accurately corrected, and a communication channel is established, so that possibility of wireless communication access increases.

In order to solve the above-described problems, another representative configuration of the present invention relates to a wireless communication method of conducting wireless communication between a mobile station and a base station by using an OFDM modulation scheme, the method comprising: notifying a notification channel (Broadcast Control Channel; BCCH) from the base station to the mobile station; in the mobile station, generating a channel to be frame synchronized with the notification channel and transmitting an OFDM symbol to the base station; in the base station, as peak detection processes thereof, removing a guard interval from the transmitted OFDM symbol to obtain an effective symbol; detecting two correlation peaks between the effective symbol and two known symbols having two different timings; calculating a timing correction amount by including one timing, which is related to the known symbol that has caused detection of one correlation peak within a predetermined timing detection range shorter than an effective symbol length of the two correlation peaks, of the two different timings into a differential from reference timing of the base station at the time of the detection of the one correlation peak; and transmitting the timing correction amount to the mobile station by means of a timing correction burst; and in the mobile station, correcting transmission timing in accordance with the timing correction amount; and transmitting a communication channel assignment request to the base station at the corrected transmission timing.

In this configuration, while the base station removes a guard interval at single timing, it detects two correlation peaks between the obtained effective symbol and two known symbols having two different timings. And, a timing correction burst is transmitted to the mobile station based on one of the two correlation peaks, which is presented within a predetermined timing detection range, namely, in the middle of the effective symbol length.

As a result of this configuration as well, transmission timing of the mobile station is accurately corrected, and a communication channel is established, so that possibility of wireless communication access increases.

It is preferable that a differential of the two timings described above is shorter than the effective symbol length. If the differential is longer than the effective symbol length, timing detection becomes confused.

One of the two timings described above may be reference timing of the base station. If the timing of removing a guard interval is reference timing of the base station, it is unnecessary to include the timing of removing a guard interval when calculating a timing correction amount.

In the event that a communication channel is not assigned from the base station despite that the mobile station transmits a communication channel assignment request to the base station, the same channel as being frame synchronized with the notification channel is regenerated to transmit an OFDM symbol to the base station and implement the peak detection processes of the base station again.

As to the cause of the event that a communication channel is not assigned from the base station, it may be assumed that the mobile station comes into a dead point, or communication power is low. In the case where the mobile station comes into a dead point, or other similar situations, if a channel to be frame synchronized with a notification channel is regenerated to transmit an OFDM signal, it is highly likely that a communication channel is immediately assigned from the base station.

In order to solve the above-described problems, still another representative configuration of the present invention relates to a wireless communication system comprising a mobile station and a base station that conduct wireless communication by using an OFDM modulation scheme, wherein the base station comprises: a notification unit that notifies the mobile station of a notification channel; a guard interval removing unit that removes a guard interval from an OFDM symbol transmitted from the mobile station through a channel generated by the mobile station at two different timings to obtain two effective symbols; a dining detection unit that detects two correlation peaks between the two respective effective symbols and a known symbol; and a correlation peak determination unit, which calculates a timing correction amount by including one timing, at which a guard interval is removed for the effective symbol that has caused detection of one correlation peak within a predetermined timing detection range shorter than an effective symbol length of the two correlation peaks, of the two different timings into a differential from reference timing of the base station at the time of the detection of the one correlation peak, and which transmits the timing correction amount to the mobile station by means of a timing correction burst, and wherein the mobile station comprises: a timing correction channel generation unit, which generates a channel to be frame synchronized with the notification channel, and which transmits an OFDM symbol to the base station; a transmission timing correction unit that corrects transmission tinting in accordance with the timing correction amount; and a communication channel assignment request unit that transmits a communication channel assignment request to the base station at the corrected transmission timing.

In order to solve the above-described problems, still another representative configuration of the present invention relates to a wireless communication system comprising a mobile station and a base station that conduct wireless communication by using an OFDM modulation scheme, wherein the base station comprises: a notification unit that notifies the mobile station of a notification channel; a guard interval removing unit that removes a guard interval from an OFDM symbol transmitted from the mobile station through a channel generated by the mobile station to obtain an effective symbol; a timing detection unit that detects two correlation peaks between the effective symbol and two known symbols having two different timings; and a correlation peak determination unit, which calculates a timing correction amount by including one timing, which is related to the known symbol that has caused detection of one correlation peak within a predetermined timing detection range shorter than an effective symbol length of the two correlation peaks, of the two different timings into a differential from reference timing of the base station at the time of the detection of the one correlation peak, and which transmits the timing correction amount to the mobile station by means of a timing correction burst, and wherein the mobile station comprises: a timing correction channel generation unit, which generates a channel to be frame synchronized with the notification channel, and which transmits an OFDM symbol to the base station; a transmission timing correction unit that corrects transmission timing in accordance with the timing correction amount; and a communication channel assignment request unit that transmits a communication channel assignment request to the base station at the corrected transmission timing.

In order to solve the above-described problems, still another representative configuration of the present invention relates to a base station that conducts wireless communication with a mobile station by using an OFDM modulation scheme, the base station comprising: a notification unit that notifies the mobile station of a notification channel; a guard interval removing unit that removes a guard interval from an OFDM symbol transmitted from the mobile station through a channel generated by the mobile station at two different timings to obtain two effective symbols; a timing detection unit that detects two correlation peaks between the two respective effective symbols and a known symbol; and a correlation peak determination unit, which calculates a timing correction amount by including one timing, at which a guard interval is removed for the effective symbol that has caused detection of one correlation peak that is detected within a predetermined timing detection range shorter than an effective symbol length of the two correlation peaks, of the two different timings into a differential from reference timing of the base station at the time of the detection of the one correlation peak; and which transmits the timing correction amount to the mobile station by means of a timing correction burst.

In order to solve the above-described problems, still another representative configuration of the present invention relates to a base station that conducts wireless communication with a mobile station by using an OFDM modulation scheme, the base station comprising: a notification unit that notifies the mobile station of a notification channel; a guard interval removing unit that removes a guard interval from an OFDM symbol transmitted from the mobile station through a channel generated by the mobile station to obtain an effective symbol; a timing detection unit that detects two correlation peaks between the effective symbol and two known symbols having two different timings; and a correlation peak determination unit, which calculates a timing correction amount by including one timing, which is related to the known symbol that has caused detection of one correlation peak within a predetermined timing detection range shorter than an effective symbol length of the two correlation peaks, of the two different timings into a differential from reference timing of the base station at the time of the detection of the one correlation peak, and which transmits the timing correction amount to the mobile station by means of a timing correction burst.

The components or the descriptions thereof, which correspond to the technical concept of the wireless communication method described above, are applicable to the corresponding wireless communication system and base station.

Advantage of the Invention

According to the present invention, in wireless communication using an OFDM modulation scheme, timing detection in the base station is more successfully accomplished, so that impossibility of access between the mobile station and the base station can be more completely avoided.

BRIEF DESCRIPTION OF DRAWINGS

FIG. 7 A view showing a timing detection range set by the timing detection unit in FIG. 4.

FIGS. 8A and 8B Flow charts for explaining correction performance of transmission timing of the PHS terminal in FIG. 2.

FIGS. 9A and 9B Flow charts for explaining other correction performance of transmission timing of the PHS terminal in FIG. 2.

DESCRIPTION OF REFERENCE NUMERALS AND SIGNS

Figure 1:
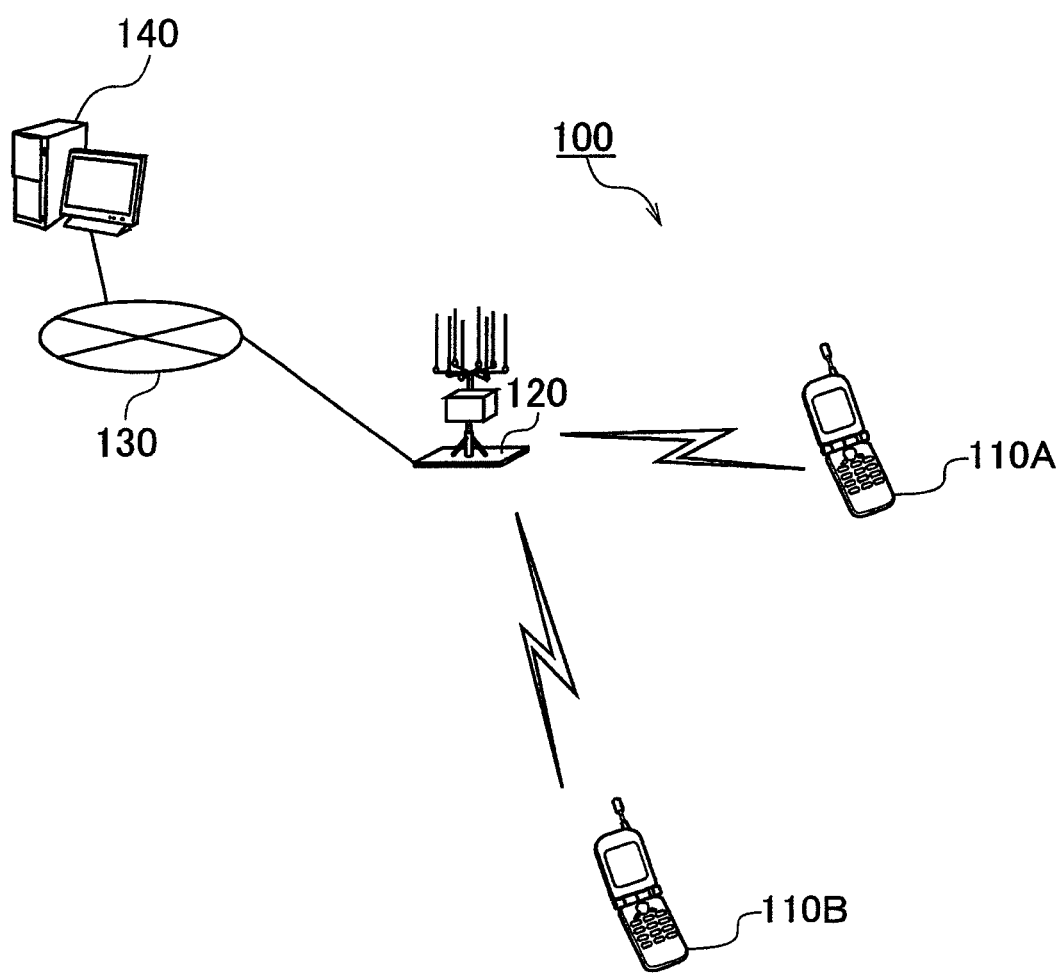
FIG. 1 A system block diagram for explaining a wireless communication system according to an embodiment.

50: Guard interval
100: Wireless communication system
110A, 110B: PHS terminal
120: Base station
140: Management server
200: Terminal control unit
202: Terminal memory
214: Timing correction channel generation unit
216: Transmission timing correction unit
218: Communication channel assignment request unit
220: OFDM modulation and demodulation unit 314: Notification unit
315: Symbol synchronization unit
316: Guard interval removing unit
317A, 317B: FFT unit
318: Timing detection unit
319: Correlation peak determination unit
320: OFDM modulation and demodulation unit
322: Demodulation•decoding unit
324: Modulation•encoding unit
326: IFFT unit
328: Guard interval insertion unit

BEST MODE FOR CARRYING OUT THE INVENTION

Hereinafter, a preferable embodiment of the present invention will be described in detail with reference to the accompanying drawings. In such an embodiment, dimensions, materials, and other particular numerical values, etc., are merely exemplary to facilitate understanding of the invention and should not be construed as limiting the present invention thereto unless otherwise expressly described herein. Meanwhile, in this specification and the drawings, components having substantially the same functions and configurations are denoted by the same reference numeral to omit repeated explanation, and components having no direct relation with the present invention are not illustrated.

When starting communication, a mobile station attempts to correct transmission timing to be synchronized with reference timing of a base station. The mobile station includes various electronic devices such as PHS terminals, mobile phones, and PDAs. However, for easy understanding, this embodiment describes a PHS terminal adopting OFDM as an example of a mobile station.

FIG. 1 is a system block diagram for explaining a wireless communication system 100 according to this embodiment. The wireless communication system 100 comprises: a PHS terminal 110 (110A, 110B); a base station 120; a communication network 130; and a management server 140. Wireless communication using an OFDM modulation scheme is conducted between the PHS terminal 110 and the base station 120.

In the wireless communication system 100, when a user attempts to make a call to the other PHS terminal 110B by using the PHS terminal 110A, namely, when the PHS terminal 110A makes an outgoing call and when the PHS terminal 110B receives an incoming call, wireless communication with the base station 120, which lies in wireless communication coverage, is established according to the operation of the user's PHS terminal 110A, and the base station 120 requests communication access to the PHS terminal 110B to the management server 140 through the communication network 130.

However, it is necessary to correct transmission timing of the PHS terminal to be synchronized with reference timing of the base station 120 prior to establishment of wireless communication between the PHS terminal 110A and the base station 120.

Figure 2:
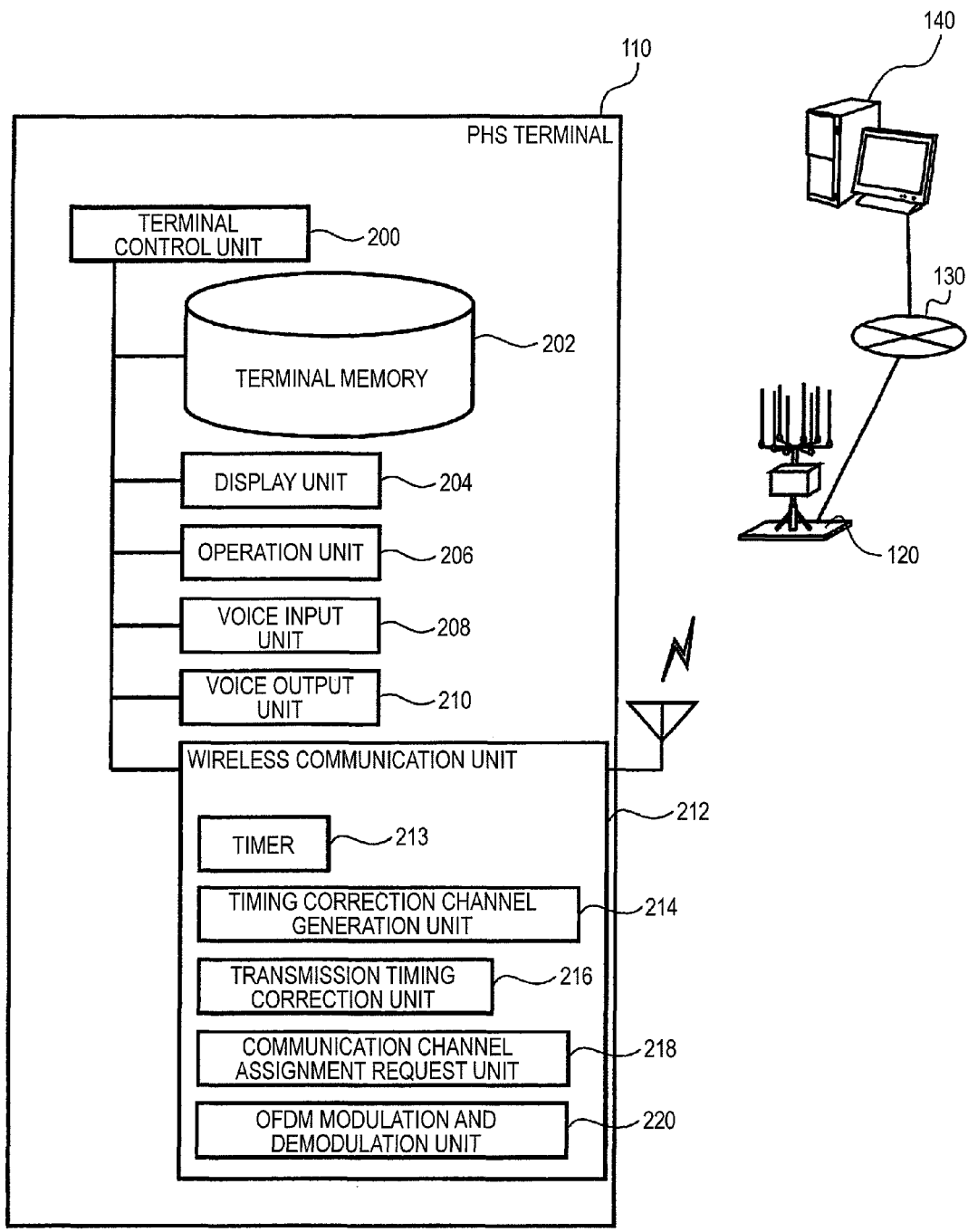
FIG. 2 A view showing detailed configuration of a PHS terminal in FIG. 1.
Figure 3:
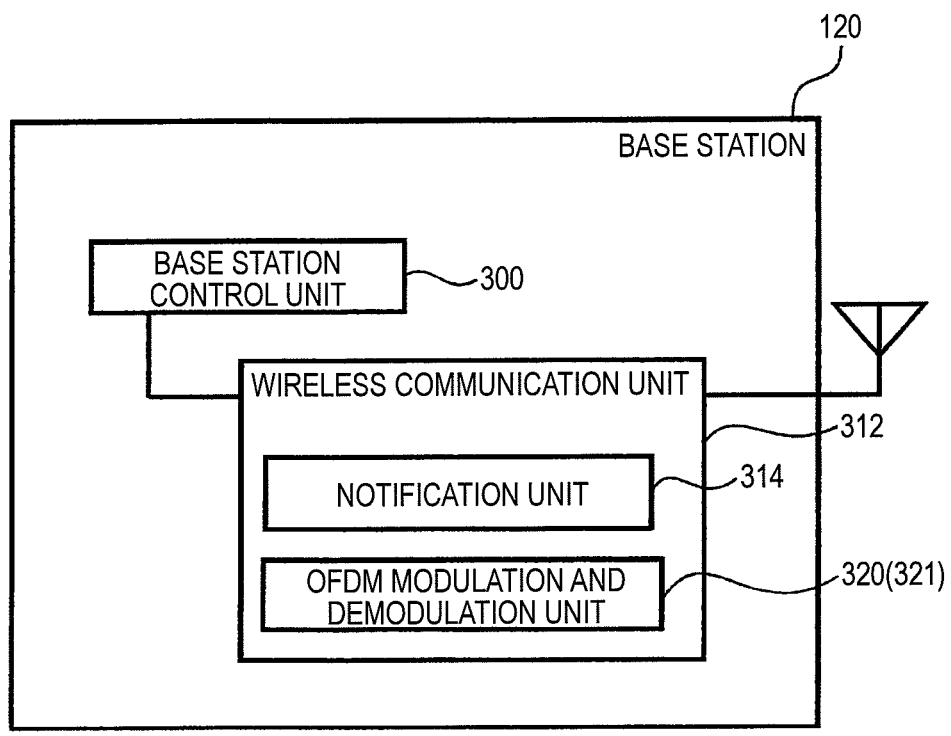
FIG. 3 A view showing detailed configuration of a base station in FIG. 1.

FIGS. 2 and 3 are views of detailed configurations of the PHS terminal and the base station in FIG. 1, respectively. As shown in FIG. 2, the PHS terminal 110 comprises: a terminal control unit 200 for controlling the terminal as a whole; a terminal memory 202; a display unit 204; an operation unit 206; a voice input unit 208; a voice output unit 210; and a wireless communication unit 212.

The terminal control unit 200 manages and controls the PHS terminal 110 as a whole by means of a semiconductor integrated circuit including a central processing unit (CPU). The terminal control unit 200 also performs call function using the PHS terminal 110 or mail transferring function, by using a program of the terminal memory 202.

The terminal memory 202 is configured by ROM, RAM, EEPROM, non-volatile RAM, flash memory, HDD, and so on. The terminal memory 202 stores programs processed in the terminal controller 200, and voice data, etc.

The display unit 204 is configured by a liquid crystal display, EL (Electro Luminescence), PDP (Plasma Display Panel), and so on. The display unit 204 can display Web Browser or GUI (Graphical User Interface) of application, stored in the terminal memory 202 or provided from an application relay server (not illustrated) through the communication network 130.

The operation unit 206 is configured by switches such as a keyboard, a cross key, and a joystick for accepting user's operation input.

The voice input unit 208 is configured by voice recognition means such as a microphone. The voice input unit 208 converts user's voice input during call into an electric signal, which can be processed in the PHS terminal 110.

The voice output unit 210 is configured by a speaker. The voice output unit 210 converts call counterpart's voice signal received in the PHS terminal 110 into voice to output the voice. In addition, the unit 210 can output ringtones, operation sound of the operation unit 206, and alarm sound, etc.

The wireless communication unit 212 conducts wireless communication with the base station 120 in a PHS telephone network. As a wireless communication scheme, this embodiment employs an OFDM scheme, which is one of multiplexing schemes that effectively uses a frequency band by using a plurality of carriers on a unit time axis and making phases of signal waves to be modulated orthogonal between adjacent carriers to partially overlap bands of the carriers. Hereinafter, the components of the wireless communication unit 212 of the PHS terminal 110 will be described.

(PHS Terminal)

The timing correction channel generation unit 214 generates a channel to be frame synchronized with a notification channel notified from the base station 120, which will be described in detail later, and transmits an OFDM symbol to the base station 120. In addition, the unit 214 measures the time after the transmission by means of a timer 213, and if a timing correction burst is not introduced from the base station 120 even after expiration of predetermined time duration, generates the same channel as being frame synchronized with the notification channel to transmit an OFDM symbol to the base station 120.

The terminal memory 202 stores the transmission timing of the channel generated by the timing correction channel generation unit 214.

If the timing correction burst is introduced from the base station 120 within a predetermined time period after the transmission of the channel, the transmission timing correction unit 216 corrects transmission timing in accordance with a timing correction amount.

The communication channel assignment request unit 218 transmits a communication channel assignment request to the base station 120 at the corrected transmission timing.

After a communication channel is established, modulation and demodulation are performed by the OFDM modulation and demodulation unit 220. The OFDM modulation and demodulation unit 220 removes a guard interval from the received OFDM symbol to apply FFT, extracts an effective symbol to demodulate the effective symbol, encodes a signal to be transmitted, and applies IFFT to obtain an effective symbol. In addition, the unit 220 inserts a guard interval to generate an OFDM symbol, which will be transmitted from the wireless communication unit 212.

(Base Station)

As shown in FIG. 3, the base station 120 comprises: a base station control unit 300 for controlling the base station 120 as a whole; and a wireless communication unit 312. The wireless communication unit 312 comprises: a notification unit 314 for notifying the PHS terminal 110 of a notification channel; and an OFDM modulation and demodulation unit 320.

Figure 4:
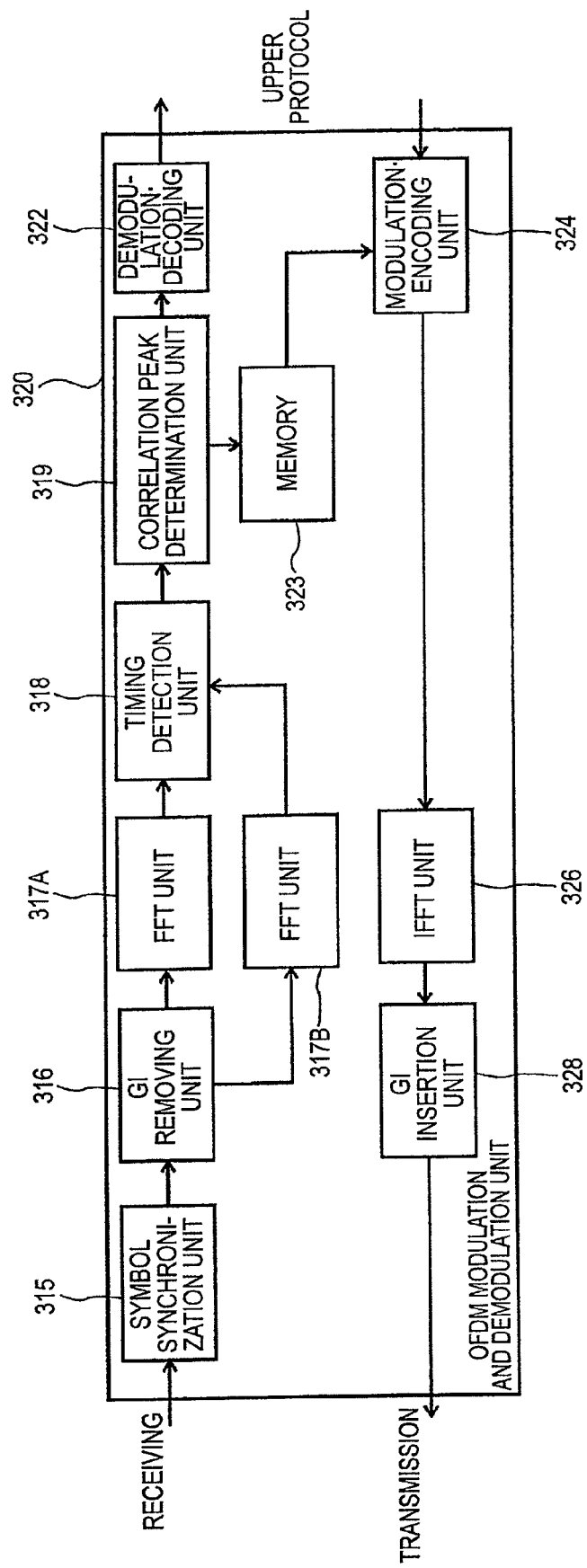
FIG. 4 A block diagram showing details of an OFDM modulation and demodulation unit in FIG. 3.

FIG. 4 is a block diagram showing details of the OFDM modulation and demodulation unit in FIG. 3. Hereinafter, the components of the OFDM modulation and demodulation unit 320 will be described.

The symbol synchronization unit 315 takes symbol synchronization with an OFDM symbol transmitted from the PHS terminal 110 through a channel generated by the PHS terminal 110.

Figure 12:
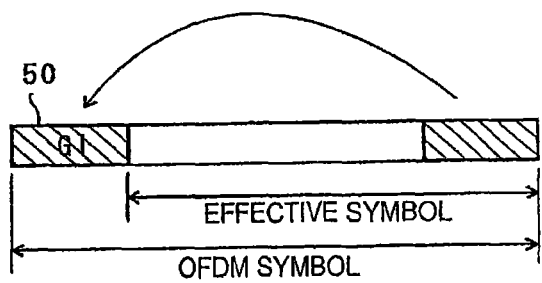
FIG. 12 A view showing configuration of an OFDM symbol used in an OFDM modulation scheme.

The guard interval removing unit 316 removes a guard interval from the OFDM symbol at two different timings to obtain two effective symbols (refer to FIG. 12). The FFT unit 317A, 317B applies FFT to these two effective symbols.

Figure 13:
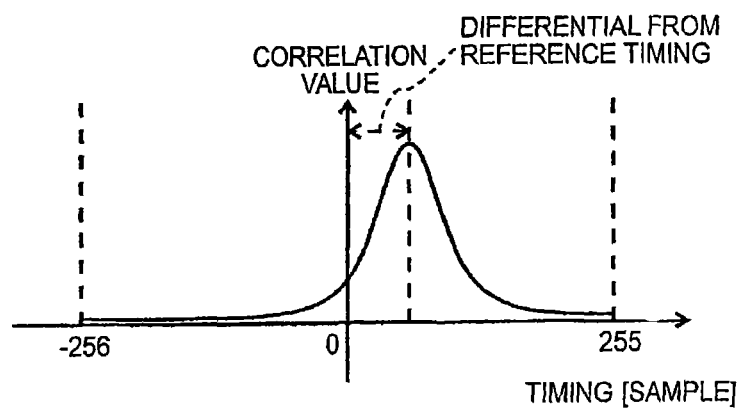
FIG. 13 A view showing that a correlation peak is detected within a timing detection range by the timing detection unit in FIG. 4.
Figure 14:
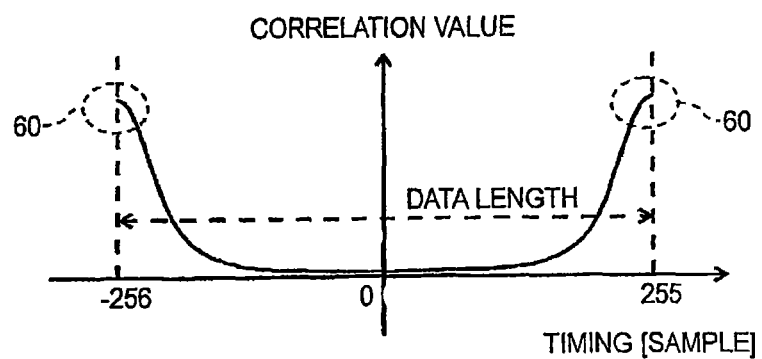
FIG. 14 A view showing that a correlation peak is detected beyond a timing detection range by the timing detection unit in FIG. 4.

The timing detection unit 318 detects two correlation peaks between the two respective effective symbols and a known symbol. The correlation peak determination unit 319 calculates a timing correction amount by including timing corresponding to a guard interval removed when generating the effective symbol that has exhibited one correlation peak, which is detected within the shorter timing detection range in FIG. 7, of the two correlation peaks detected by the timing detection unit 318 into a differential between the one correlation peak of the two correlation peaks detected by the timing detection unit 318 and reference timing (refer to FIG. 13) of the base station 120. Then, the correlation peak determination unit 319 transmits the timing correction amount to the PHS terminal 110 by means of a timing correction burst.

Specifically, the timing correction amount is recorded in the memory 323 and transmitted to the modulation•encoding unit 324 to generate a timing correction burst.

In addition, as illustrated in FIG. 7, the timing detection range is a range shifted from both ends of the effective symbol toward the inward direction.

The effective symbol that has undergone this process is demodulated in the demodulation•decoding unit 322. Meanwhile, a signal to be transmitted is modulated•encoded in the modulation and encoding unit 324. The IFFT unit 326 applies IFFT to the encoded signal to obtain an effective symbol. Thereafter, the guard interval insertion unit 328 inserts a guard interval into the effective symbol to obtain an OFDM symbol and transmit the same.

Figure 5:
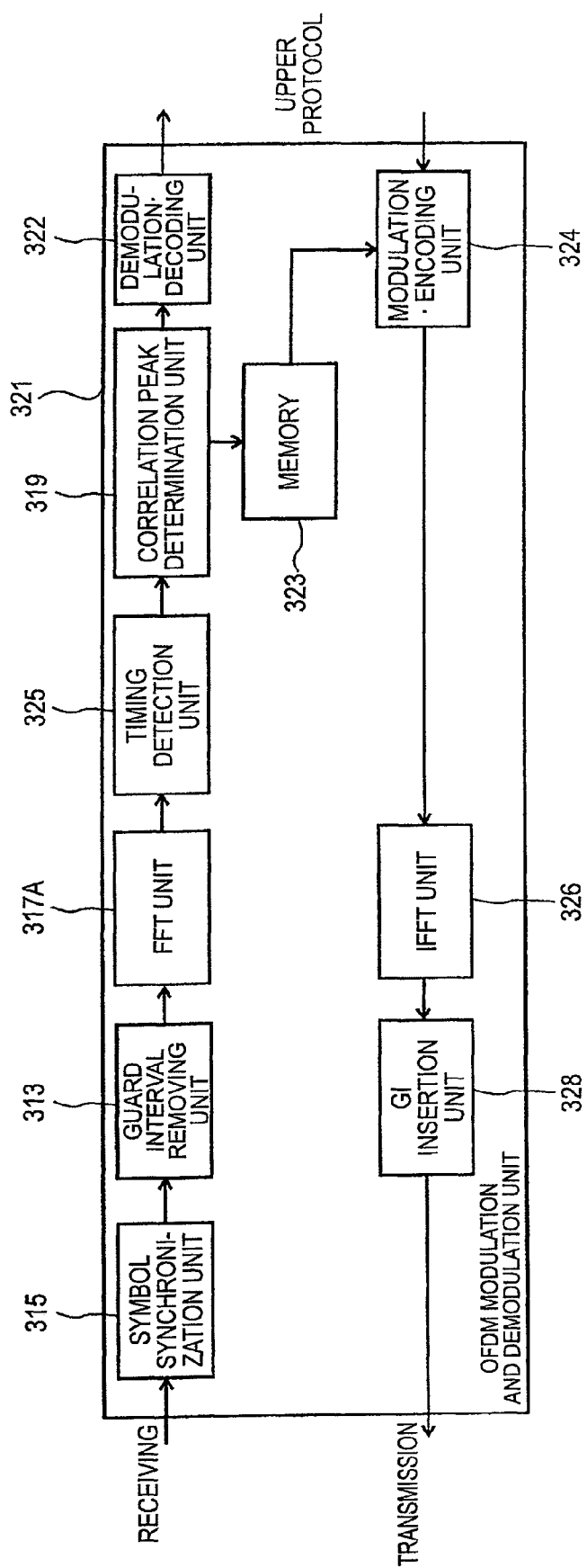
FIG. 5 A block diagram showing details of another embodiment of the OFDM modulation and demodulation unit in FIG. 3.

FIG. 5 is a block diagram showing details of another embodiment of the OFDM modulation and demodulation unit in FIG. 3. As to a difference from FIG. 4, the guard interval removing unit 313 of the OFDM modulation and demodulation 321 removes a guard interval at single timing. In addition, the single FFT unit 317A applies FFT. There are no changes in timing until this process.

Figure 6A:
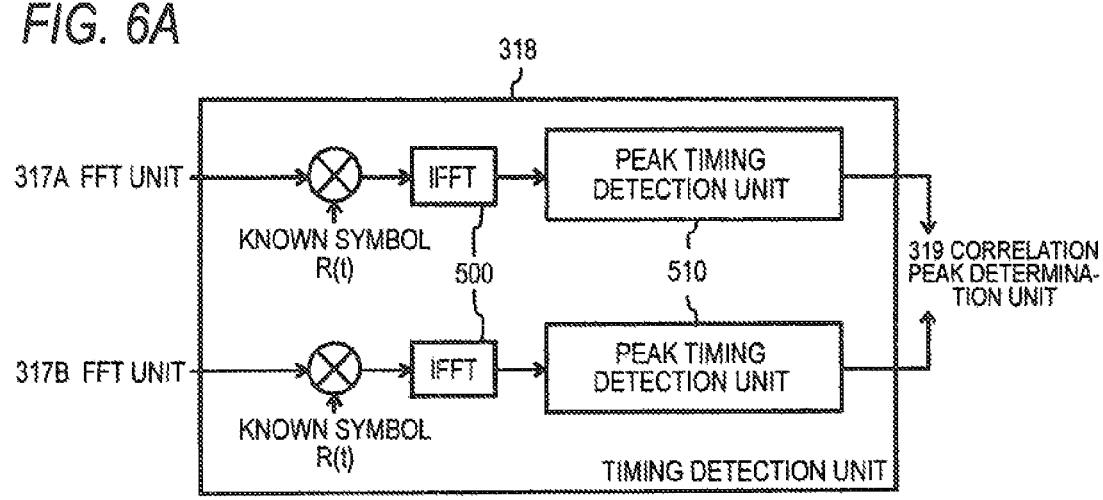
FIGS. 6A and 6B Views showing interior configuration of timing detection units in FIGS. 4 and 5, respectively.
Figure 6B:
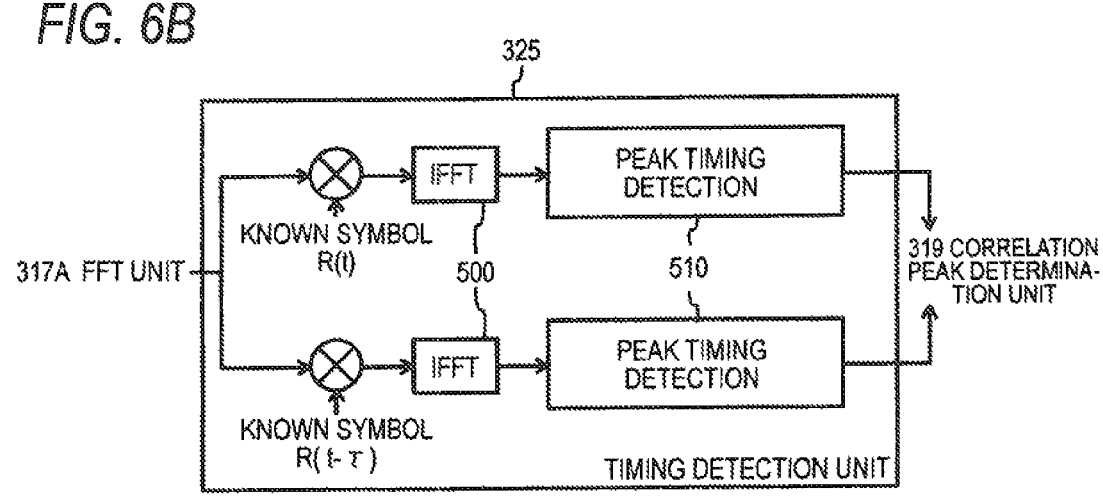

FIGS. 6A and 6B are block diagrams showing interior configuration of the timing detection units 318, 325 in FIGS. 4 and 5, respectively. As illustrated in FIG. 6A, since a guard interval is removed at two timings in FIG. 4, two signals are input in the timing detection unit 318 to obtain correlation with each known symbol R(t), to which IFFT is applied by the IFFT unit 500, so that two correlation peaks are detected in the peak timing detection unit 510.

Meanwhile, as illustrated in FIG. 6B, since a guard interval is removed at single timing in FIG. 5, one signal is input in the timing detection unit 318. The timing detection unit 325 is characterized by obtain correlation peaks with two known symbols R(t) and R(t−τ) having two different timings. Like this, two correlation peaks can be obtained even from changing timing of a known symbol. Since the follow-up processes of the correlation peak determination unit 319 are the same as already described, explanation thereof is omitted herein.

FIGS. 8A and 8B and FIGS. 9A and 9B are flow charts for explaining collection performance of transmission timing of the PHS terminal 110. FIGS. 8A and 8B and FIGS. 9A and 9B show the performance in the ease where the base station 120 has the OFDM modulation and demodulation unit 320 in FIG. 4 and the performance in the case where the base station 120 has the OFDM modulation and demodulation unit 321 in FIG. 5, respectively. In the flow charts, "P:" relates to processes of the PHS terminal 110, and "Base:" relates to processes of the base station.

In order to explain FIGS. 8A and 9B, firstly, a notification channel is notified from the base station 120 to the PHS terminal 110 (S400). Then, the PHS terminal 110 generates a channel to be frame synchronized with the notification channel and transmits an OFDM symbol to the base station 120 (S402).

Subsequently, with regard to peak detection processes of the base station 120, a guard interval is removed from the transmitted OFDM symbol by the guard interval removing unit 316 at two different timings to obtain two effective symbols (S403). After the FFT unit 317A, 317B applies an FFT process (S405A, S405B), two correlation peaks between the two respective effective symbols and a known symbol are detected by the timing detection unit 318 (S404).

The correlation peak determination unit 319 of the base station 120 selects one of the correlation peaks, which is detected within a predetermined timing detection range (FIG. 7) shorter than an effective symbol length (S406). And, the correlation peak determination unit 319 calculates a timing correction amount by including one timing, at which a guard interval is removed for the effective symbol that has caused detection of the one correlation peak, of two different timings into a differential (FIG. 13) from reference timing of the base station 120 at the time of the detection of the one correlation peak. Then, the correlation peak determination unit 319 transmits the timing correction amount to the PHS terminal 110 by means of a timing correction burst (S408).

Meanwhile, if any one of the two correlation peaks is not detected within the timing detection range, namely, if the correlation peaks are detected at both sides of an effective symbol length (512 samples) as illustrated in FIG. 7, the correlation peak determination unit 319 does not transmit a timing correction bust.

In the PHS terminal 110, the time after the transmission of the OFDM symbol to the base station 120 is measured by the timer 213. And, whether or not the timing correction burst has been received within a predetermined time period is determined (S410). If the timing correction burst is not introduced from the base station 120 even after expiration of predetermined time duration, the same channel as being frame synchronized with the notification channel is generated to transmit an OFDM symbol (S402) and implement the peak detection processes of the base station 120 again.

Meanwhile, in the PHS terminal 110, if the timing correction burst is introduced from the base station 120 within a predetermined time period, transmission timing is corrected in accordance with the timing correction amount (S416). And, a communication channel assignment request is transmitted to the base station 120 at the corrected transmission timing (S418).

Figure 15:
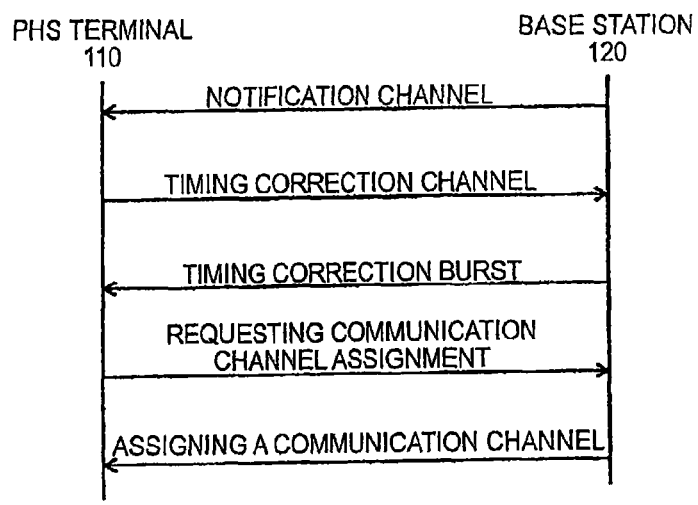
FIG. 15 A sequential view, in which communication channel assignment is successfully accomplished in a related art.
Figure 16:
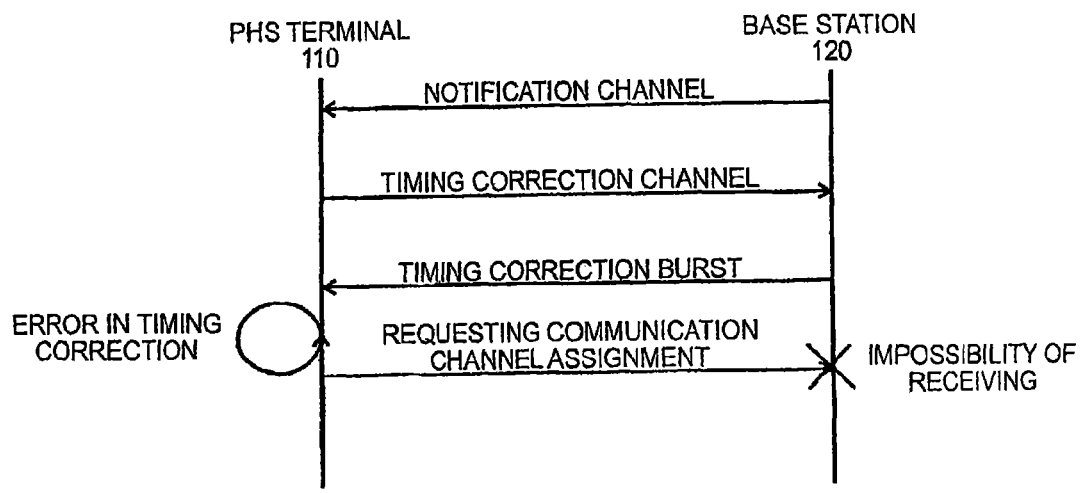
FIG. 16 A sequential view, in which communication channel assignment is failed in the related art.

In the related art as well, if timing is detected after a guard interval is removed, and a correlation peak within an effective symbol length to which IFFT is applied increases, timing detection is successfully accomplished, and communication channel assignment is performed (FIG. 15). However, there is a case where a correlation peak at both sides of the effective symbol length increases. In this case, since an incorrect correlation peak is detected, an error occurs in timing correction. As a result, a communication channel assignment request has not been received in the base station, and communication channel assignment has been failed (FIG. 16).

Figure 9A:
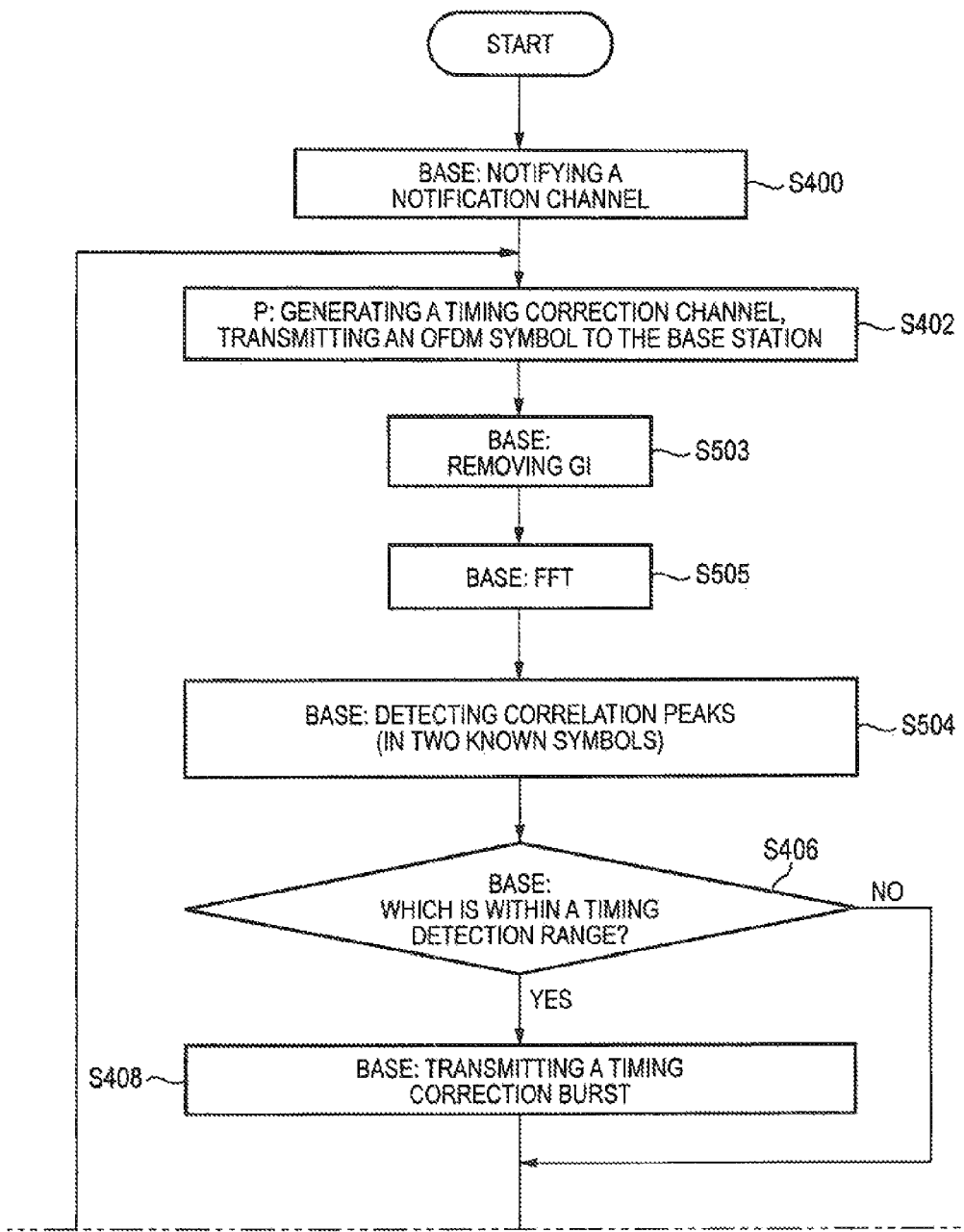
Figure 10:
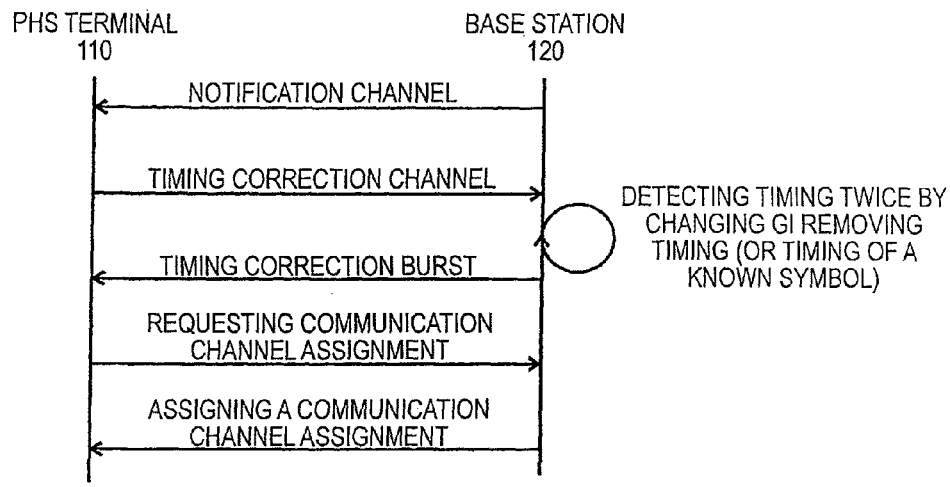
FIG. 10 A sequential view showing that assignment of a communication channel is successfully accomplished by generating a second timing correction channel in FIGS. 8A and 8B or FIGS. 9A and 9B.

Thus, in this embodiment, according to the flow chart in FIGS. 8A and 9B, the base station 120 detects two correlation peaks by removing a guard interval at two different timings and transmits a timing correction burst to the PHS terminal 110 based on one of the correlation peaks, which is presented within a predetermined timing detection range, namely, in the middle of an effective symbol length, as shown in FIG. 10.

As shown in FIG. 10, in the PHS terminal 110 of this embodiment, if a generated timing correction channel is transmitted, timing is detected twice in the base station 120, and a correlation peak is detected within a predetermined timing detection range, the timing correction burst is returned to the PHS terminal 110. As a result, transmission timing of the PHS terminal 110 is accurately corrected, and a communication channel is established, so that possibility of wireless communication access increases.

The differential between the two timings set in S403 in FIG. 8A is shorter than the effective symbol length (512 samples). If the differential is longer than the effective symbol length, timing detection becomes confused.

The differential of the two timings may be specifically determined as set forth below. That is, a length obtained by subtracting a timing detection range Y from the data length (512 samples) in FIG. 7 is X (X=512−Y). A shorter one of X and Y is the differential of the two timings. If X and Y are the same, any of them may be selected. Typically, selecting X=about 40 may be selected as the differential. In other words, the timing detection range Y=about 470 is preferable.

One of the two timings described above may be reference timing of the base station 120. If timing of removing the guard interval 50 is reference timing of the base station 120, it is unnecessary to include the timing of removing the guard interval 50 when calculating a timing correction amount.

Figure 8B:
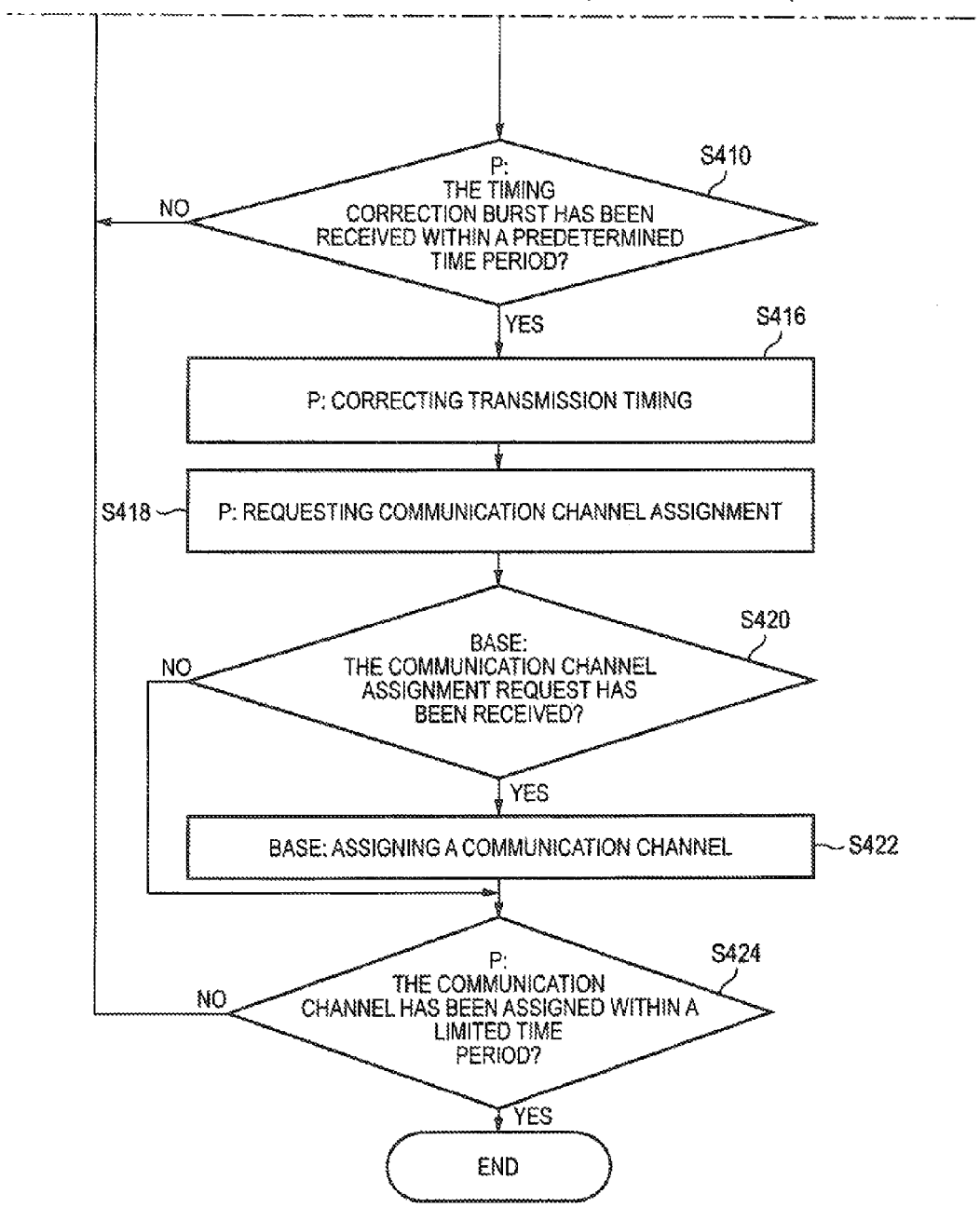

FIGS. 8A and 8B, there is a ease where even if the PHS terminal 110 transmits a communication channel assignment request to the base station 120 (S418) a communication channel is not assigned from the base station 120. As to the cause, it may be assumed that the base station 120 could not have received the communication channel assignment request since the PHS terminal 110 has come to a dead point, or communication power is low. When the base station 120 receives the communication channel assignment request in S420, the base station 120 necessarily assigns a communication channel to the PHS terminal 110 (S422). If not, however, communication channel assignment is not performed.

Figure 11:
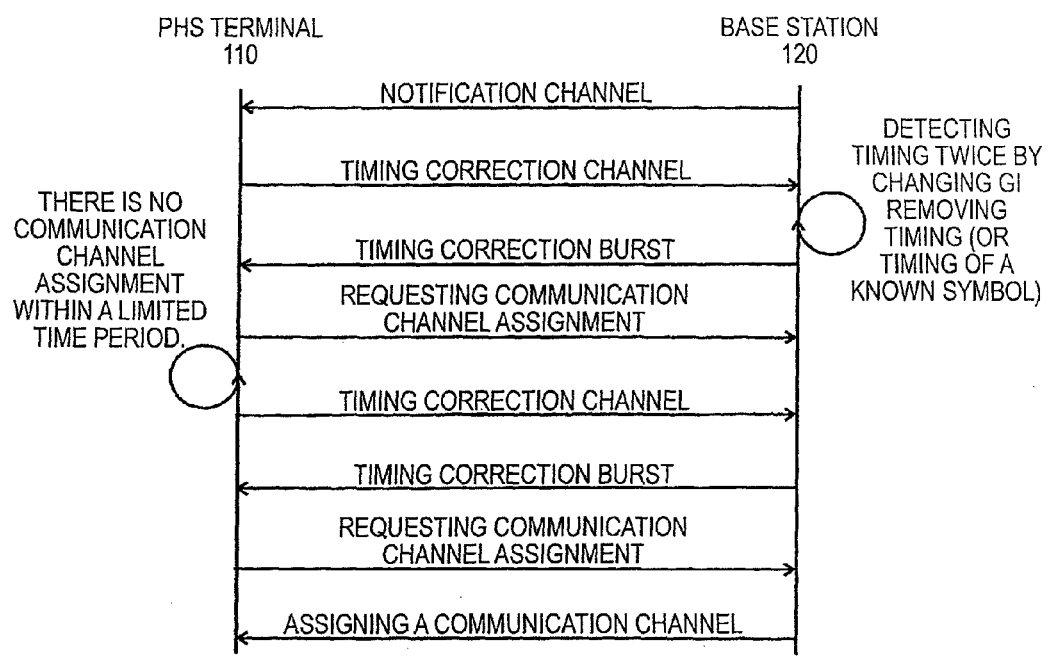
FIG. 11 A sequential view showing that assignment of a communication channel is successfully accomplished by regenerating a previously generated timing correction channel in FIGS. 8A and 8B or FIGS. 9A and 9B in a case where a communication channel is not assigned.

In that case, in this embodiment, as shown in FIG. 11, the PHS terminal 110 prepares a limited time period in advance, and if a communication channel is not assigned within the limited time period (S424), the same channel as being frame synchronized with a notification channel is regenerated to transmit an OFDM symbol to the base station 120 (S402) and implement the peak detection processes (steps following S403) of the base station 120 again.

If a channel to be frame synchronized with a notification channel is regenerated to transmit an OFDM signal in the event that the mobile station comes into a dead point, or other similar situations, it is highly likely that a communication channel is immediately assigned from the base station (FIG. 11).

In FIG. 11, if the timing correction burst cannot be obtained in S410 and if a communication channel is not assigned in S424, the same channel as being frame synchronized with a notification channel is generated (turning back to S402). However, since this case rarely occurs, processes may be terminated for the reason of access failure.

Subsequently, FIGS. 9A and 9B will be described. FIGS. 8A and 8B are different from FIGS. 8A and 8B in terms of S503, S505, and S504. As to peak detection processes of the base station 120, a guard interval is removed from a transmitted OFDM symbol at single timing by the guard interval removing unit 313 to obtain an effective symbol (S503), and the FFT unit 317A performs an FFT process (S505). Thereafter, two correlation peaks with the effective symbol and two known symbols having two different timings are detected (S504). Since the follow-up processes are the same as illustrated in FIGS. 8A and 8B, explanation thereof is omitted herein.

As described, while the preferable embodiment of the present invention has been described with reference to the accompanying drawings, it goes without saying that the present invention is not limited to the embodiment. It is apparent to one skilled in the art that various modifications and changes can be made within the scope set forth in the claims, and it should be understood that such modifications and changes fall under the technical scope of the present invention.

While the present invention has been described in detail with reference to a particular embodiment, it is apparent to one skilled in the art that various modifications and changes can be made without departing from the spirit and the scope of the present invention.

The present application is based on Japanese Patent Application No. 2008-016974 filed on Jan. 28, 2008 and Japanese Patent Application No. 2008-081382 filed on Mar. 26, 2008, the disclosures of which are herein incorporated by reference.

INDUSTRIAL APPLICABILITY

The present invention is applicable to a wireless communication method, a wireless communication system, and a base station, which conduct wireless communication using an OFDM modulation scheme.

The invention claimed is:

1. A wireless communication method of conducting wireless communication between a mobile station and a base station by using an Orthogonal Frequency Division Multiplexing (ODFM) modulation scheme, the method comprising:
   notifying the mobile station of a notification channel from the base station;
   in the mobile station,
       providing a channel to be frame synchronized with the notification channel and transmitting an OFDM symbol to the base station;
   in the base station,
       removing a guard interval from the transmitted OFDM symbol at two different timings to obtain two effective symbols;
       detecting two correlation peaks between the two respective effective symbols and a known symbol;
       calculating a timing correction amount by adding a timing, which corresponds to a guard interval removed when generating the effective symbols exhibiting a first correlation peak detected within a predetermined timing detection range that is shorter than an effective symbol length of the two correlation peaks, to a differential between the first correlation peak and reference timing of the base station;

transmitting the timing correction amount to the mobile station by means of a timing correction burst;

in the mobile station, correcting transmission timing in accordance with the timing correction amount; and transmitting a communication channel assignment request to the base station at the corrected transmission timing.

2. The wireless communication method claimed in claim 1, wherein the differential between the first correlation peak and reference timing of the base station is shorter than the effective symbol length.

3. The wireless communication method claimed in claim 1, wherein if a communication channel is not assigned from the base station despite that the mobile station transmits a communication channel assignment request to the base station, the method provides another channel to be frame synchronized with the notification channel and transmits a second OFDM symbol to the base station and implement peak detection processes of the base station again.

4. A wireless communication method of conducting wireless communication between a mobile station and a base station by using an Orthogonal Frequency Division Multiplexing (ODFM) modulation scheme, the method comprising:

notifying a notification channel from the base station to the mobile station;

in the mobile station, generating a channel to be frame synchronized with the notification channel and transmitting an OFDM symbol to the base station;

in the base station, removing a guard interval from the transmitted OFDM symbol to obtain an effective symbol;

detecting two correlation peaks between the effective symbol and two known symbols having two different timings;

calculating a timing correction amount by adding a timing of the known symbols that has detected a first correlation peak, which is detected in a predetermined timing detection range that is shorter than an effective symbol length, of the two correlation peaks to a differential between the first correlation peak and reference timing of the base station;

transmitting the timing correction amount to the mobile station by means of a timing correction burst, and in the mobile station, correcting transmission timing in accordance with the timing correction amount; and transmitting a communication channel assignment request to the base station at the corrected transmission timing.

5. The wireless communication method claimed in claim 4, wherein the differential between the first correlation peak and reference timing of the base station is shorter than the effective symbol length.

6. The wireless communication method claimed in claim 4, wherein if a communication channel is not assigned from the base station despite that the mobile station transmits a communication channel assignment request to the base station, the method provides another channel to be frame synchronized with the notification channel and transmits a second OFDM symbol to the base station and implements a peak detection processes of the base station again.

7. A wireless communication system comprising a mobile station and a base station, which conduct wireless communication by using an Orthogonal Frequency Division Multiplexing (ODFM) modulation scheme, wherein the base station comprises:

a notification unit that notifies the mobile station of a notification channel;

a guard interval removing unit that removes a guard interval from an OFDM symbol transmitted from the mobile station through a channel generated by the mobile station at two different timings to obtain two effective symbols;

a timing detection unit that detects two correlation peaks between the two respective effective symbols and a known symbol; and a correlation peak determination unit, which calculates a timing correction amount by adding a timing, which corresponds to a guard interval removed when generating the effective symbols exhibiting a first correlation peak detected within a predetermined timing detection range that is shorter than an effective symbol length of the two correlation peaks to a difference between the first correlation peak and reference timing of the base station, and which transmits the timing correction amount to the mobile station by means of a timing correction burst, and wherein the mobile station comprises:

a timing correction channel generation unit, which generates a channel to be frame synchronized with the notification channel, and which transmits said OFDM symbol to the base station;

a transmission timing correction unit that corrects transmission timing in accordance with the timing correction amount; and a communication channel assignment request unit that transmits a communication channel assignment request to the base station at the corrected transmission timing.

8. A wireless communication system comprising a mobile station and a base station, which conduct wireless communication by using an Orthogonal Frequency Division Multiplexing (ODFM) modulation scheme, wherein the base station comprises:

a notification unit that notifies the mobile station of a notification channel;

a guard interval removing unit that removes a guard interval from an OFDM symbol transmitted from the mobile station through a channel generated by the mobile channel to obtain an effective symbol;

a timing detection unit that detects two correlation peaks between the effective symbol and two known symbols having two different timings; and a correlation peak determination unit, which calculates a timing correction amount by adding a timing of the known symbol that has detected a first correlation peak, which is detected within a predetermined timing detection range that is shorter than an effective symbol length, of the two correlation peaks to a differential between the first correlation peak and reference timing of the base station, and which transmits the timing correction amount to the mobile station by means of a timing correction burst, and wherein the mobile station comprises:
- a timing correction channel generation unit, which generates a channel to be frame synchronized with the notification channel, and which transmits an said OFDM symbol to the base station;
- a transmission timing correction unit that corrects transmission timing in accordance with the timing correction amount; and
- a communication channel assignment request unit that transmits a communication channel assignment request to the base station at the corrected transmission timing.

9. A base station that conducts wireless communication with a mobile station by using an Orthogonal Frequency Division Multiplexing (ODFM) modulation scheme, the base station comprising:
- a notification unit that notifies the mobile station of a notification channel;
- a guard interval removing unit that removes a guard interval from an OFDM symbol transmitted from the mobile station through a channel generated by the mobile station at two different timings to obtain two effective symbols;
- a timing detection unit that detects two correlation peaks between the two respective effective symbols and a known symbol; and
- a correlation peak determination unit, which calculates a timing correction amount by adding a timing corresponding to a guard interval removed when generating the effective symbols exhibiting a first correlation peak, which is detected within a predetermined timing detection range that is shorter than an effective symbol length, of the two correlation peaks to a differential between the first correlation peak and reference timing of the base station, and which transmits the timing correction amount to the mobile station by means of a timing correction burst.

10. A base station that conducts wireless communication with a mobile station by using an Orthogonal Frequency Division Multiplexing (ODFM) modulation scheme, the base station comprising:
- a notification unit that notifies the mobile station of a notification channel;
- a guard interval removing unit that removes a guard interval from an OFDM symbol transmitted from the mobile station through a channel generated by the mobile station to obtain an effective symbol;
- a timing detection unit that detects two correlation peaks between the effective symbol and two known symbols having two different timings; and
- a correlation peak determination unit, which calculates a timing correction amount by adding a timing of the known symbols that has detected a first correlation peak, which is detected within a predetermined timing detection range that is shorter than an effective symbol length, of the two correlation peaks to a differential between the first correlation peak and reference timing of the base station, and which transmits the timing correction amount to the mobile station by means of a timing correction burst.

* * * * *